(12) United States Patent
Srinivasan et al.

(10) Patent No.: US 8,284,918 B2
(45) Date of Patent: Oct. 9, 2012

(54) MEDIA SPECIFIC FEATURE INVOCATION SIGNALING IN ENHANCED COMMUNICATION SYSTEMS

(75) Inventors: Srivatsa Srinivasan, Renton, WA (US); Sundaram Anantharaman, Redmond, WA (US); Gene Y. Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 12/356,291

(22) Filed: Jan. 20, 2009

(65) Prior Publication Data

US 2010/0183136 A1 Jul. 22, 2010

(51) Int. Cl.
*H04M 3/42* (2006.01)
(52) U.S. Cl. ......... 379/207.02; 379/201.01; 379/201.02; 379/201.05
(58) Field of Classification Search ............. 379/207.02, 379/87, 93.17, 207.04, 201.01, 201.05, 201.02, 379/201.03
See application file for complete search history.

(56) References Cited

U.S. PATENT DOCUMENTS

| | | | |
|---|---|---|---|
| 6,118,861 | A | 9/2000 | Gutzmann et al. |
| 7,209,475 | B1 | 4/2007 | Shaffer et al. |
| 7,266,591 | B1 | 9/2007 | Johnston |
| 2005/0069099 | A1 | 3/2005 | Kozdon et al. |
| 2005/0152336 | A1 | 7/2005 | Bratt et al. |
| 2007/0153770 | A1 | 7/2007 | Goyal et al. |
| 2007/0201448 | A1 | 8/2007 | Baird et al. |
| 2007/0223673 | A1 | 9/2007 | Pfleging et al. |
| 2008/0095345 | A1 | 4/2008 | Sharma et al. |
| 2008/0175176 | A1 | 7/2008 | George et al. |
| 2008/0192913 | A1* | 8/2008 | Gopinath et al. ........ 379/207.04 |
| 2008/0273671 | A1* | 11/2008 | Miao et al. ...................... 379/87 |
| 2009/0168978 | A1* | 7/2009 | Laws et al. ................. 379/93.17 |

OTHER PUBLICATIONS

"Release Notes for Cisco CallManager Release 5.0(2)", Retrieved at <<http://www.ciscosystems.com/en/US/docs/voice_ip_comm/cucm/rel_notes/5_0_2/502cmrn.html>>, Nov. 24, 2008, pp. 116.

* cited by examiner

*Primary Examiner* — Thjuan K Addy
(74) *Attorney, Agent, or Firm* — Merchant & Gould P.C.

(57) ABSTRACT

Subscribers of an enhanced communication system are enabled to indicate invocation or clearing of media specific features such as music-on-hold or video-on-hold. The invocation or clearing is transmitted to participating end points as a Session Initiation Protocol (SIP) re-INVITE message with Session Description Protocol (SDP) attribute descriptions identifying the feature, applicable media channels and whether the message is for invocation or clearing of the feature.

20 Claims, 6 Drawing Sheets

MEDIA SPECIFIC FEATURE INVOCATION SIGNALING IN ENHANCED COMMUNICATION SYSTEMS

BACKGROUND

As an alternative to Public Switched Telephone Network (PSTN) systems, cellular phone networks have proliferated over the last decade where users with cellular phones have access to one or more networks at almost any location. Also a recent development is the wide spread use of Voice over IP (VOIP) telephony, which uses internet protocol over wired and wireless networks. With the availability of such diverse types of communication networks and devices capable of taking advantage of various features of these networks, a new technology is bringing different communication networks together providing until now unavailable functionality such as combining various modes of communication (e.g. instant messaging, voice calls, video communications, etc.). This technology is referred to as unified communications (UC). A network of servers manages end devices capable of handling a wide range of functionality and communication while facilitating communications between the more modern unified communication network devices and other networks (e.g. PSTN, cellular, etc.).

Complex functionalities such as multi-modal communication, presence based features, dynamic attribute assignment, and preservation of conversations are accommodated by UC systems taking advantage of server/network functionality and end point device capabilities. Since communication between components of such networks involves much more than simple exchange of digital or analog voice signals, enhanced data exchange protocols (at various layers) are employed like Session Initiation Protocol, Session Description Protocol, and comparable ones.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an enhanced communication and conferencing system that enables subscribers to indicate invocation of media specific features such as music-on-hold, application of the feature(s) to specific media channel(s), and use of the media specific features as facilitated by the underlying communication protocol.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
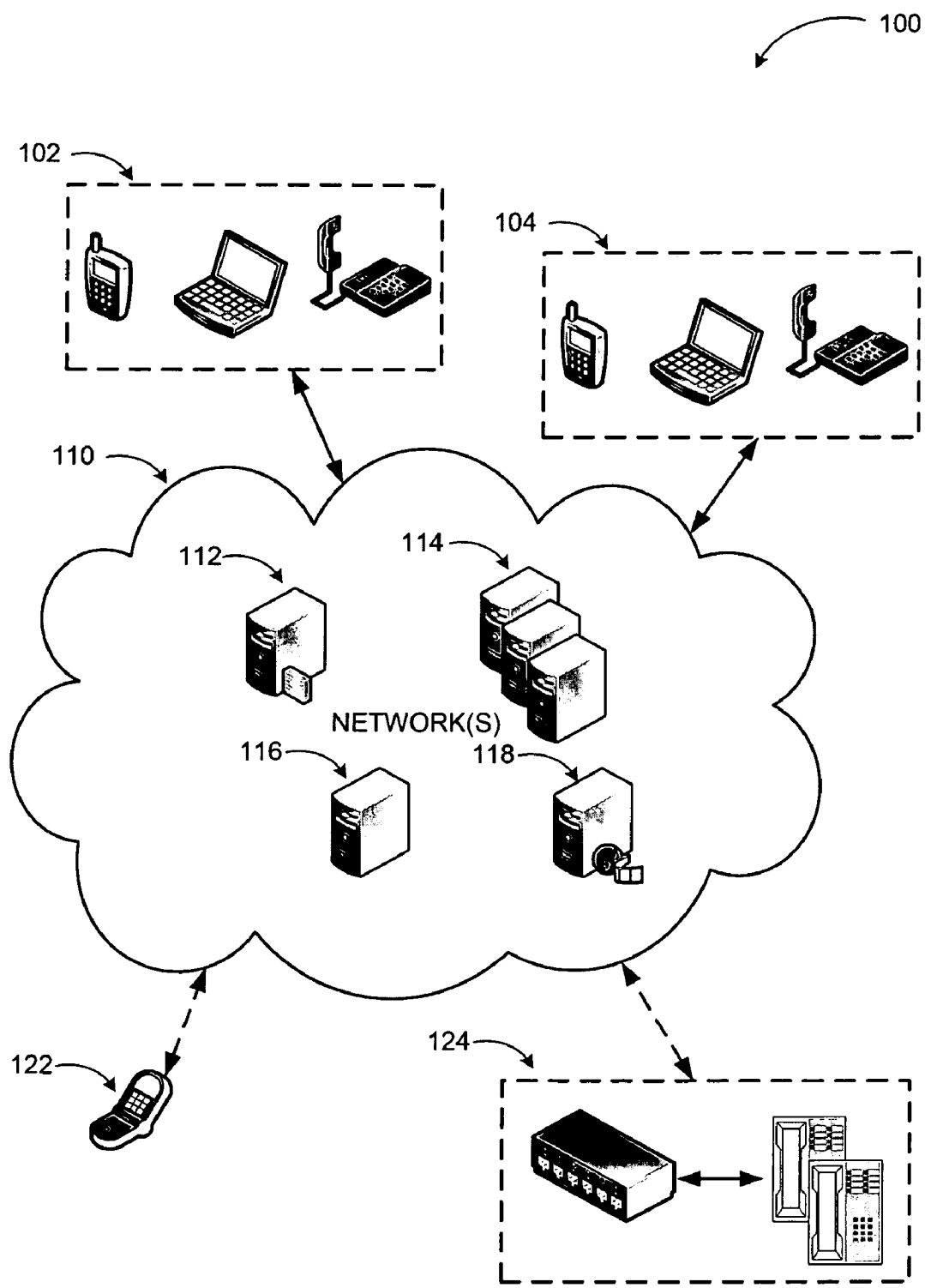
FIG. 1 is a diagram illustrating an example unified communications system.

As briefly discussed above, media specific features may be invoked and used by participants in a unified communications system through a specific media channel. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for use of media specific features in enhanced communication systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 of an example unified communications system is illustrated. As mentioned above, a unified communication system is a real-time communications system facilitating instant messaging, presence, audio-video conferencing, web conferencing, and similar functionality.

In a unified communication system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network (PSTN). End devices may include any type of smart phone, cellular phone, any computing device executing a communication application, a smart automobile console, and advanced phone devices with additional functionality.

Unified Communication (UC) Network(s) 110 includes a number of servers performing different tasks. For example, UC servers 114 provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

The SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

SIP is intended to provide a signaling and call setup protocol for IP-based communications that can support a superset of the call processing functions and features present in the PSTN. SIP by itself does not define these features, however. Rather, its focus is call-setup and signaling. SIP is also designed to enable the building of such features in network elements known as proxy servers and user agents. These are features that permit familiar telephone-like operations: dialing a number, causing a phone to ring, hearing ring back tones or a busy signal.

SIP-enabled telephony networks can also implement many of the more advanced call processing features. SIP is a client/server protocol that enables peer-to-peer connectivity because each side can function as a client and a server at the same time. As such it requires a relatively simple core network with intelligence distributed to the network edge, embedded in endpoints (end devices built in either hardware or software). SIP features are implemented in the communicating endpoints (i.e. at the edge of the network) as opposed to being implemented in the network.

While the example systems are described with SIP features in following figures, many other Voice over IP (VoIP) protocols exist and embodiments may be implemented with any of those protocols using the principles described herein.

Figure 2:
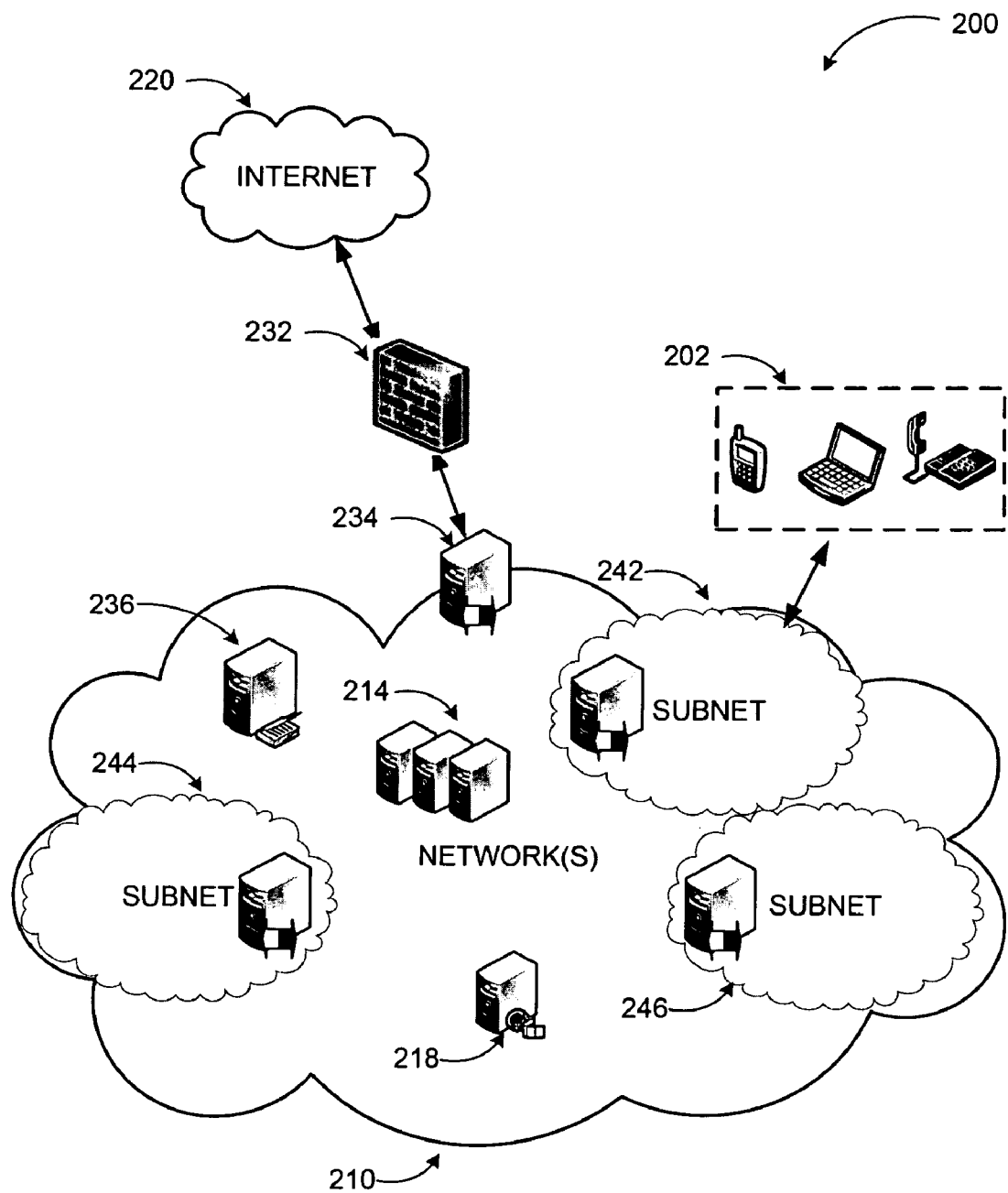
FIG. 2 illustrates another example unified communications system with various subnets and servers facilitating communication with other networks.

FIG. 2 illustrates another example unified communications system with various subnets facilitating communication with other networks. Network 210 in diagram 200 is a UCN as discussed above. Network 210 may include a number of subnets such as subnets 242, 244, and 246. Network 210 may include one or more of the servers discussed above such as UC servers 214 and facilitate communication for client devices 202.

A/V server 218 is shown as an example server for facilitating conferences between clients of the system as well as callers connecting through other systems. Edge server 234 and firewall 232 are an example of a split access server functionality. Firewall 232 provides protection for connections with other networks such as Internet 220, while edge server 234 provides connectivity through the perimeter network. According to some embodiments, one or more edge servers may provide connectivity to clients connected to network 210 with clients through other networks. According to other embodiments, each subnet within network 210 may be equipped with its own edge server. As mentioned above, one or more of the UC servers 214 may act as home servers to the clients of the system.

In a unified communications system, multiple channels may be utilized for dedicated functionality such as a presence channel to publish presence information (e.g. dynamic contact cards and similar information) or a media channel to exchange audio/video streams as well as media related information. Information exchanged through the dedicated channels may be managed by one or more servers (e.g. A/V server 218, edge servers) or directly exchanged between two or more communicating end points (202). SIP or similar protocols including extensions of such protocols may be employed to exchange information through dedicated channels. In a system according to embodiments, end points may be enabled to indicate invocation of a media related feature such as music-on-hold and the specific media channel to which the feature applies.

While the example systems in FIGS. 1 and 2 have been described with specific components such as mediation server, A/V server, and the like, embodiments are not limited to these components or system configurations and can be implemented with other system configuration employing fewer or additional components. Functionality of the systems enabling signaling of media specific feature invocation may also be distributed among the components of the systems differently depending on component capabilities and system configurations.

Figure 3:
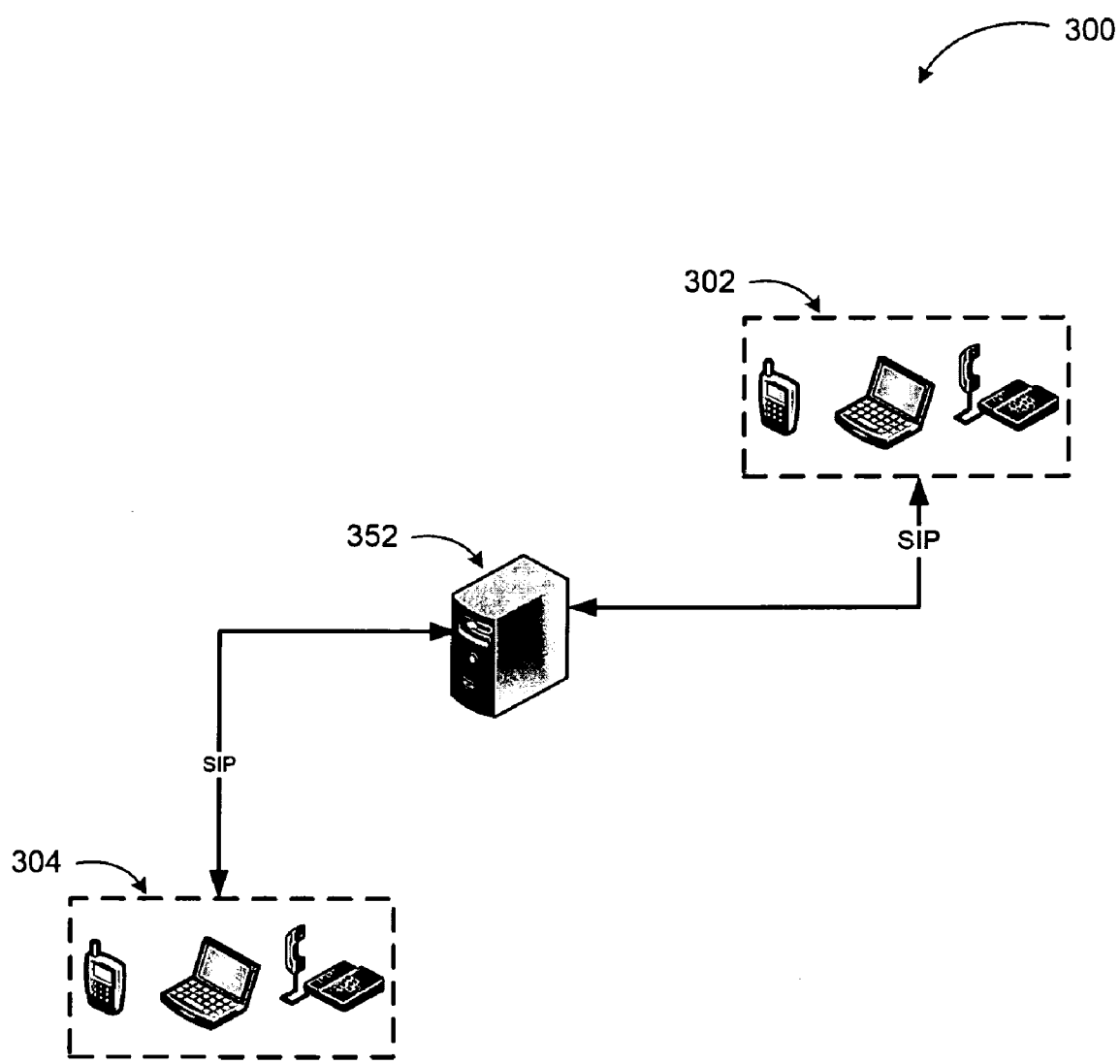
FIG. 3 illustrates an example basic system where enhanced communication features may be invoked and used through underlying communication protocols.

FIG. 3 illustrates an example basic system 300, where enhanced communication features may be invoked and used through underlying communication protocols. Many topologies of unified communication networks utilizing servers for connectivity to other networks and clients, and home servers within the UCN may be implemented. Examples include, but are not limited to, consolidated topology, where three different server roles (access server, conferencing server, and A/V server) may be collocated on a single physical computing device; single site topology, where access server and conferencing server may be collocated on a single physical computing device while A/V server is implemented as a separate server; scaled single site topology, where the structure similar to the single site topology is complemented by load balancing servers for each edge server and a reverse proxy server; and multi-site topology supporting multiple sites for organizations with remote sites that are geographically dispersed and are connected through Wide Area Networks (WANs). A basic system with two end points and a server are shown in this diagram for simplicity.

As mentioned previously, SIP and related protocols along with extensions may be employed to indicate invocation and use of media specific features. One of those protocols is Session Description Protocol (SDP), which is a format for describing streaming media initialization parameters in an ASCII string. SDP is intended for describing multimedia communication sessions for the purposes of session announcement, session invitation, and other forms of multimedia session initiation. SDP does not provide the content of the media form itself but simply provides a negotiation between two end points to allow them to agree on a media type and format. This allows SDP to support upcoming media types and formats, enabling systems based on this technology to be forward compatible. SDP is implemented as a component of other protocols such as Session Announcement Protocol (SAP), Real time Transport Protocol (RTP), Real-time Streaming Protocol (RTSP), and SIP. SDP is also employed as a standalone format for describing multicast sessions In a system employing SDP, a conference is a set of two or more communicating users along with the software they are using; a session is the multimedia sender and receiver and the flowing stream of data; a session announcement (also referred to as session advertisement) is a mechanism by which a session description is conveyed to users in a proactive fashion, i.e., the session description was not explicitly requested by the user; and a session description is a well defined format for conveying sufficient information to discover and participate in a multimedia session.

A session is described by a series of attribute/value pairs, one per line. The attribute names are single characters, followed by '=', and a value. Optional values are specified with '=*'. Values are either an ASCII string, or a sequence of specific types separated by spaces. Attribute names are only unique within the associated syntactic construct, i.e. within the Session, Time, or Media. Some examples of SDP syntax include:

v=(protocol version)
o=(originator and session identifier)
s=(session name)
i=* (session information)
u=* (URI of description)
e=* (email address)p=* (phone number)
c=* (connection information)
b* (zero or more bandwidth information lines)
One or more time descriptions ("t=" and "r=" lines)
z=* (time zone adjustments)
k=* (encryption key)
a=* (session attribute line(s)) media description(s)

A system according to embodiments enables a communicating party to indicate features, such as music-on-hold, are being invoked and that the invocation applies to a specific media channel in SDP (and not the entire session). Moreover, another communicating party may be enabled to use the above to indicate the feature music-on-hold.

A media-specific SDP extension attribute "a=feature" may be defined, according to one embodiment, for an end point (302 or 304) to indicate to the other party (in an established SIP dialog) that a media specific feature is being invoked for that specific media session. This may be used by SIP user agents to render appropriate user interface to notify the user. The syntax for this notification may be a=feature HCOLON <feature>, where <feature> may be the feature being invoked.

Thus, an example attribute definition for music-on-hold feature (MoH) may be a=feature:MoH. Of course other media specific features may also be invoked similarly. Client application's invocation of features may include the feature attribute in offers sent in a re-INVITE after the SIP dialog has been established. Answers to offers and other SIP message may not be appropriate for feature invocation notifications. If there are any re-INVITES with SDP that are generated when the feature has been invoked, syntax containing the elements defined below is used according to some embodiments, unless the feature is being cleared.

A client application invoking music-on-hold, according to one embodiment, includes following in the resulting offer: "a=sendonly" indicating the feature is being sent and "a=feature:MoH" for one or more media channels. The client application may also include sip.rendering, with a value of "no" if all media channels contain the "a=feature:MoH" attribute.

In-order to clear the music-on-hold feature or to retrieve the call, the client application includes in the resulting offer "a=sendrecv" and NOT the "a=feature:MoH" attribute for those media channels that are being cleared. This indicates to other client applications that the feature is being cleared for the listed media channels. The client application may also exclude sip.rendering, if none of the media channels contain the "a=feature:MoH" attribute. Following are two example offers for invoking and clearing, respectively, the music-on-hold feature:

m=audio 52033 RTP/SAVP 114 111 112 115 116 4 8 0 97 13 118 101
a=sendonly
a=feature:MoH
m=audio 52033 RTP/SAVP 114 111 112 115 116 4 8 0 97 13 118 101
a=sendrecv In an example scenario, a client application sends an offer invoking music-on-hold that includes "a=sendonly" and "a=feature:MoH" for the m=audio line indicating the client application is setting the music-on-hold for that audio channel. If the offering client application has only a single audio m line, the offer needs to include sip.rendering="no" in the signaling, as specified above. According to another example scenario, a client application may initiate an offer with "a=sendrecv" and without an "a=feature:MoH" attribute for clearing the music-on-hold feature. As mentioned before, if this was the only single audio m line, the offer needs to exclude sip.rendering in signaling, in addition. The above described operations may be managed and facilitated by a server according to other embodiments, such as server 352.

The operations and scenarios, as well as components of a unified communication system supporting invocation and use of media specific features through a media channel, described in FIG. 1-3 are exemplary for illustration purposes. A unified communication system according to embodiments may be implemented using additional or fewer components and other schemes using the principles described herein.

Figure 4:
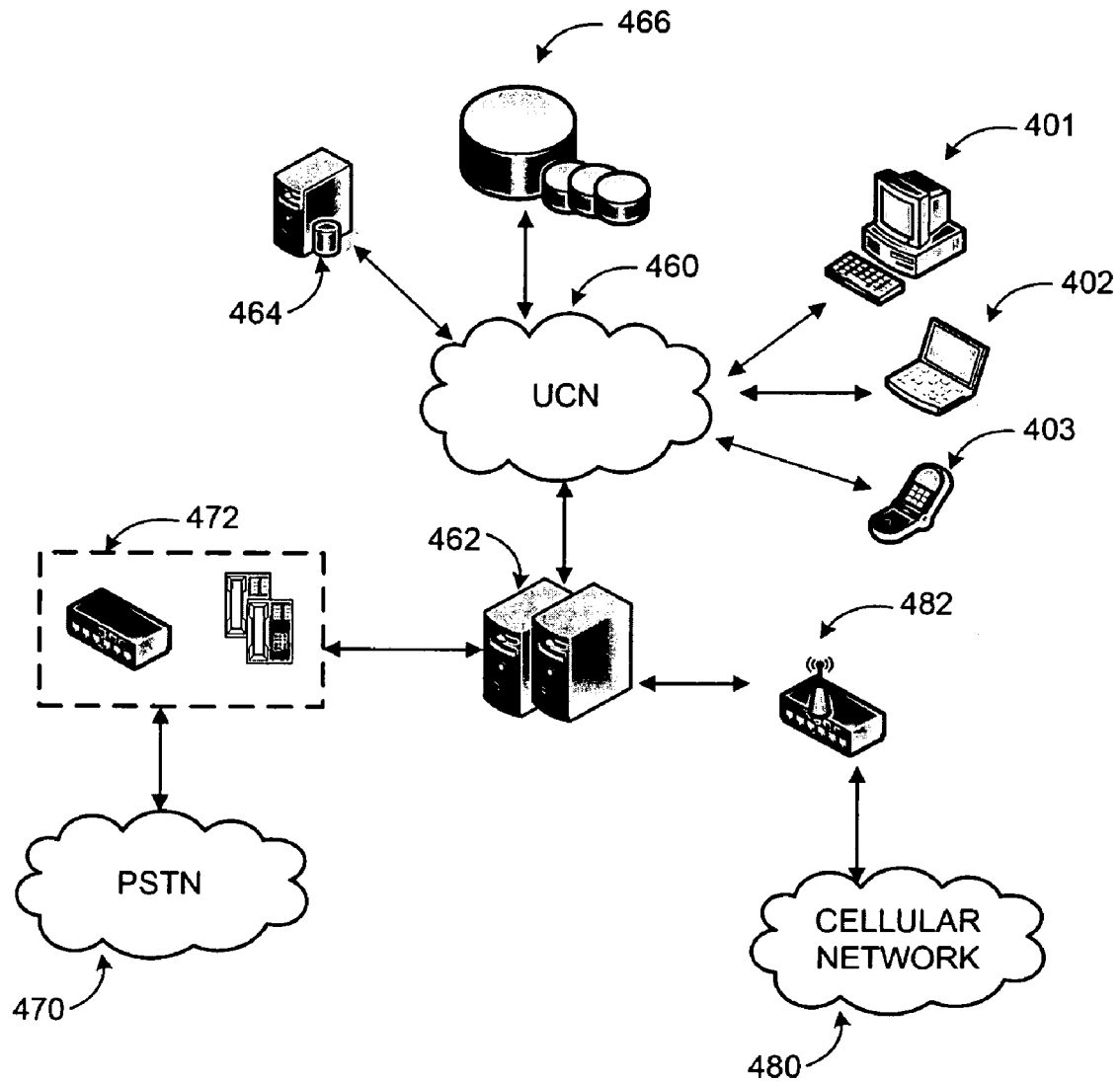
FIG. 4 illustrates a general networked environment where embodiments may be implemented.

FIG. 4 is an example general networked environment, where embodiments may be implemented. Media specific feature invocation and use in an enhanced communication system, as described previously, may be implemented locally or in a distributed manner over a number of physical and virtual clients and servers. Such a system may typically involve one or more networks such as PSTN 470, cellular network 480, and UCN 460. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application (e.g. a unified communication application) or a client device. A system according to embodiments may involve many more components, typical and relevant ones are discussed in conjunction with this figure.

Mediation server(s) 462 may provide signaling and media exchange between the different systems. A PBX 472 and an RF modem 482 may be used for connection between the PSTN and the cellular networks, respectively, and the mediation server(s) 462. Client devices 401-403 communicate with each other and with devices on other networks through UCN 460. The UC system may also include a one or more specialized or combination servers (not shown) for presence, routing, and other functionalities.

Communication applications executed on end devices 401-403 may be enabled to exchange SDP extensions for indicating to each other invocation of a media specific feature and associated media channel, as well as use of the feature, as explained above. Data associated with the system such as media, configuration information (e.g. user names, phone numbers, call policies, configuration, records, etc.), and other network related information may be stored in one or more data stores such as data stores 466, which may be directly accessed by the servers and/or clients of the system or managed through a database server 464. UCN 460 provides the backbone of the UC system and may employ a number of protocols such as SIP, SDP, RTP, and the like. Client devices (e.g. 401-403) provide platforms for UCN user end points. Users may access the communication system using a client device or one or more client applications running on a client device.

UCN 460 provides communication between the nodes described herein. By way of example, and not limitation, UCN 460 may include wired media such as a wired network or direct-wired connection, and wireless media such as acoustic, RF, infrared and other wireless media. Many other configurations of computing devices, applications, data sources, data distribution systems may be employed to implement embodiments. Furthermore, the networked environments discussed in FIG. 4 are for illustration purposes only. Embodiments are not limited to the example applications, modules, or processes.

Figure 5:
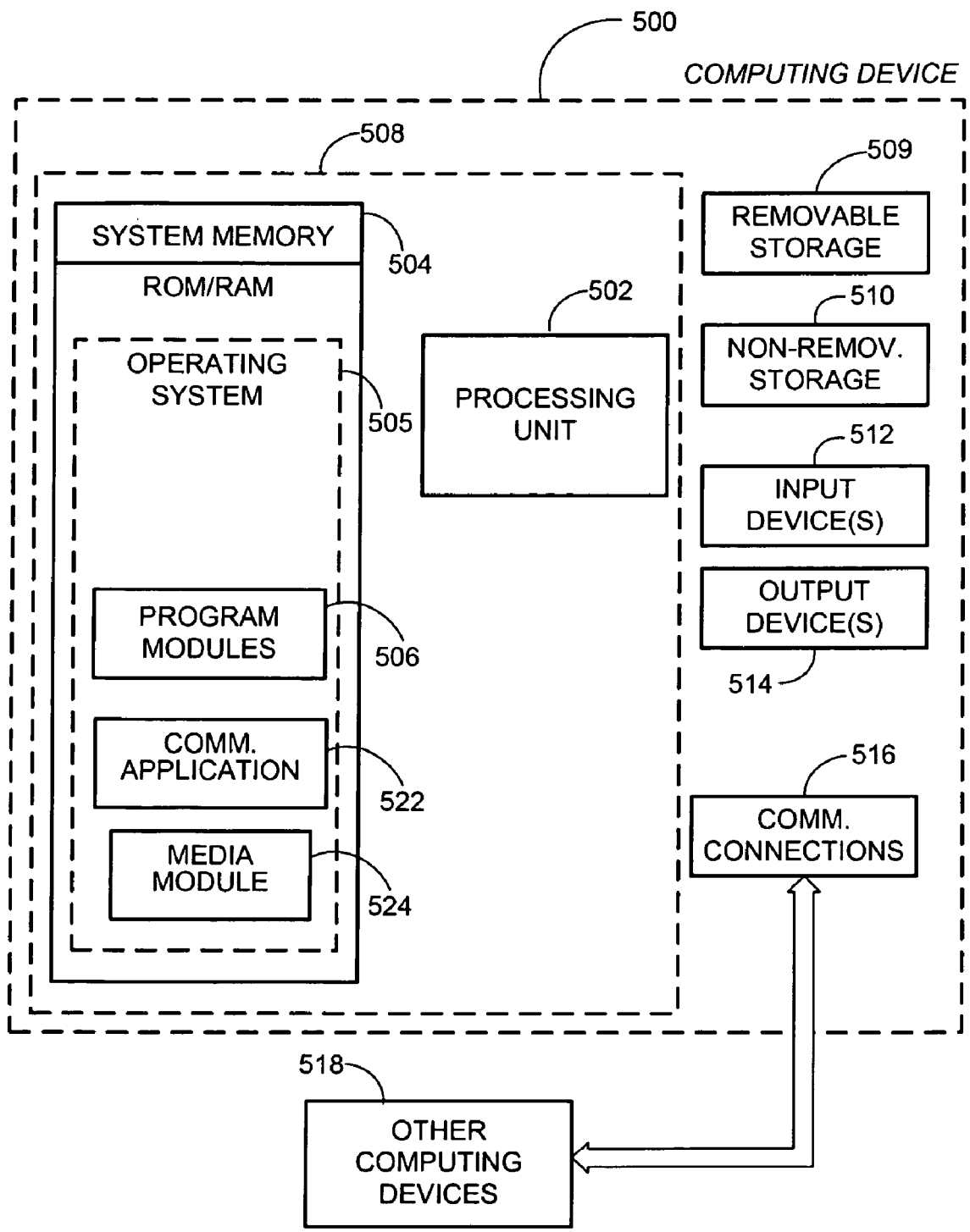
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a client device executing a communication application in an enhanced communication system where media specific features may be invoked and used by signaling over SDP. Computing device 500 may typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the computing device, such as the WINDOWS® operating systems from MICROSOFT CORPORATION of Redmond, Wash. The system memory 504 may also include one or more software applications such as program modules 506, communication application 522, and media module 524.

Communication application 522 and media module 524 may be separate applications or integral modules of a hosted service application that provide advanced communication services through computing device 500 employing SDP extensions such as those discussed previously to signal to other communication applications the invocation of a media specific feature and which media channel the feature applies. Other communication applications may also respond in similar fashion indicating use of the feature or lack of capabilities to perform actions associated with the feature. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s)

512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include client devices and servers of a UC network as discussed above. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
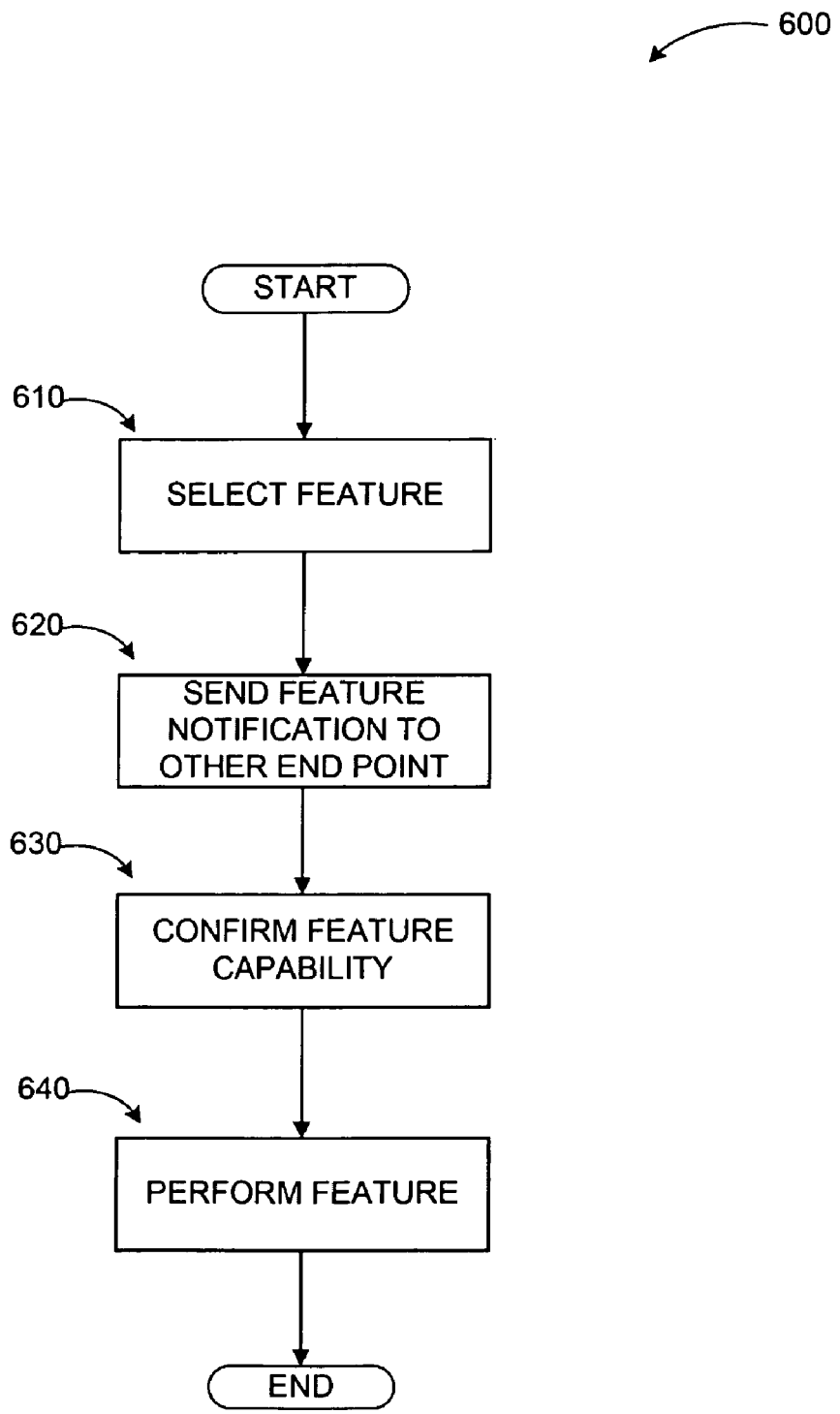
FIG. 6 illustrates a logic flow diagram for a process of invoking and using media specific features in an enhanced communication system according to embodiments.

FIG. 6 illustrates a logic flow diagram for process 600 of signaling invocation and use of media specific features over SDP among end points of an enhanced communication system according to embodiments. Process 600 may be implemented in a client communication application as discussed previously.

Process 600 begins at operation 610, where an indication of a user selection of a media specific feature is received by the user's client application. The feature may be a music-on-hold feature or similar ones. The selection may be received through a static or dynamic user interface element (i.e. the communication application may determine availability of capabilities such as media channels, peripheral devices, and so on, and dynamically provide user interface elements). At operation 620, an offer is sent using SDP extensions such as those described above defining a feature attribute and which media channel the feature applies to. Receiving end point(s) may respond with a confirmation of feature capability at operation 630. For example, an end point that lacks a speaker or microphone may inform the offering end point that is does not have the capability to perform actions necessary for the music-on-hold feature. Upon confirmation of the capabilities of the receiving end point(s), the feature may be used by the receiving end point(s) at operation 640 as requested. The offer sent at operation 620 may also include one for clearing an active music-on-hold feature or comparable features. Another example feature that may be invoked and used through a similar process includes local music, where the music is used from a local source instead of being streamed through the network from the requesting end point.

The operations included in process 600 are for illustration purposes. Media specific feature invocation and use signaling over SDP in enhanced communication systems may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing media specific features in a unified communication network (UCN), the method comprising:
    receiving an indication of a media specific feature at a first communication application;
    sending, from the first communication application to a second communication application, an invitation indicating invocation of the media specific feature;
    receiving, at the first communication application from the second communication application, a confirmation of a capability to perform at least one action associated with the invoked media specific feature at the second communication application; and
    communicating with the second communication application invoking the media specific feature.

2. The method of claim 1, wherein an extension of Session Description Protocol (SDP) is employed to communicate the invocation of the media specific feature.

3. The method of claim 2, wherein the invitation is sent as a re-INVITE offer employing an SDP session attribute for an established Session Initiation Protocol (SIP) session.

4. The method of claim 3, wherein the session attribute is applicable to at least one specified media channel.

5. The method of claim 2, wherein the media specific feature is one of: a music-on-hold feature and a video-on-hold feature.

6. The method of claim 2, further comprising:
    receiving an indication for clearing an invoked media specific feature at the first communication application;
    sending another invitation to the second communication application indicating clearing of the invoked media specific feature; and
    clearing the invoked media specific feature at the second communication application.

7. The method of claim 6, wherein the other invitation is a re-INVITE offer employing an SDP attribute for each media channel associated with the invoked media specific feature.

8. The method of claim 1, wherein the invitation is used by a SIP user agent to render at least one user interface element for notifying a user associated with the second communication application.

9. The method of claim 1, wherein the invitation is sent to a plurality of communication applications participating in an established SIP communication session with the first communication application.

10. A system for providing media specific features in a unified communication network (UCN), the system comprising:
    a mediation server coupled to at least a first end point and a second endpoint configured to:
        facilitate exchange of messages and media between the first end point and the second endpoint employing SIP sessions and SDP descriptions;

the first end point for providing multi-modal communication services through the UCN, the first end point configured to:
  receive a request for invoking a media specific feature;
  send a SIP re-INVITE that includes an SDP attribute description for the media specific feature to the second end point participating in an established SIP session through the mediation server; and
the second end point for providing multi-modal communication services through the UCN, the second end point configured to:
  receive the SIP re-INVITE for invoking a media specific feature from the first endpoint;
  confirm local capability to facilitate the media specific feature; and
  perform the invoked media specific feature.

11. The system of claim 10, wherein the media specific feature is a music-on-hold feature applicable for a media channel specified by the first end point.

12. The system of claim 11, wherein the SDP descriptions associated with the SIP re-INVITE include an originator identified, a session identifier, a session name, a session attribute specifying the music-on-hold feature, and a media channel identifier.

13. The system of claim 11, wherein the first end point is further configured to:
  receive a request for clearing the invoked media specific feature;
  send a SIP re-INVITE that includes another SDP attribute description for the invoked media specific feature to the second end point participating in the established SIP session through the mediation server; and
wherein the second end point is further configured to:
  receive the SIP re-INVITE for clearing the invoked media specific feature from the first endpoint; and
  clear the media specific feature for all channels included in the SIP re-INVITE.

14. The system of claim 11, further comprising a conferencing server configured to:
  in response to receiving the SIP re-INVITE for invoking the media specific feature during a communication session from any participant, issue a SIP re-INVITE to remaining participants for invoking the media specific feature.

15. The system of claim 11, wherein SDP attribute descriptions for invoking the media specific feature include "a=sendonly" and "a=feature:MoH", where MoH represents music-on-hold, wherein the SDP attribute description for clearing the media specific feature includes "a=sendrecv" and no description of the feature, and wherein both SDP attribute descriptions include an identification of applicable media channels.

16. The system of claim 11, wherein the "sip.rendering" with a "no" value is sent if all media channels contain the media specific feature in the SIP re-INVITE for invoking the media specific feature, and wherein the "sip.rendering" is excluded if no media channels contain the media specific feature in the SIP re-INVITE for clearing the media specific feature.

17. A computer-readable storage medium not consisting of a modulated data signal, the computer-readable storage medium having instructions stored thereon for providing music-on-hold features in a unified communication network (UCN) system, the instructions comprising:
  rendering, at a first communication application, user interface elements for invocation of the music-on-hold feature;
  upon receiving an invocation of the music-on-hold feature, transmitting to a second communication application a SIP re-INVITE with SDP extensions invoking the music-on-hold feature for an established SIP session;
  receiving at the first communication application an ACCEPT from the second communication application confirming a capability of a client device executing the second communication application to perform the music-on-hold feature;
  transmitting a communication invoking the music-on-hold feature;
  rendering, at the first communication application, additional user interface elements for clearing of the invoked music-on-hold featurel; and
  upon receiving an indication to clear the invoked music-on-hold feature, transmitting to the second communication application another SIP re-INVITE with SDP extensions clearing the invoked music-on-hold feature for the established SIP session.

18. The computer-readable storage medium of claim 17, wherein a client device executing the second communication application is not capable of performing the music-on-hold feature without a functioning speaker.

19. The computer-readable storage medium of claim 17, wherein the SIP re-INVITE and the another SIP re-INVITE messages include identification of media channels to which the music-on-hold feature is to be applied.

20. The computer-readable storage medium of claim 17, wherein the music-on-hold feature includes one of: music streamed from the first communication application and music from a local source of the second communication application.

* * * * *